US008843647B1

(12) United States Patent
Sandoval

(10) Patent No.: US 8,843,647 B1
(45) Date of Patent: Sep. 23, 2014

(54) SYSTEMS AND METHODS FOR APPLICATION SERVER SELF-SERVICE CONSOLE

(75) Inventor: Luis Fernando Landivar Sandoval, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 914 days.

(21) Appl. No.: 12/133,709

(22) Filed: Jun. 5, 2008

(51) Int. Cl.
*G06F 15/16* (2006.01)
*G06F 21/31* (2013.01)

(52) U.S. Cl.
CPC ..................................... *G06F 21/31* (2013.01)
USPC ........................... 709/229; 709/217; 709/219

(58) Field of Classification Search
CPC ....................................................... G06F 21/31
USPC ......................................... 709/217, 219, 229
See application file for complete search history.

(56) References Cited

U.S. PATENT DOCUMENTS

| 5,953,514 | A | 9/1999 | Gochee |
| 6,463,459 | B1 | 10/2002 | Orr et al. |
| 6,510,523 | B1 * | 1/2003 | Perlman et al. .................. 726/6 |
| 2004/0199647 | A1 * | 10/2004 | Ramarao et al. ............ 709/229 |
| 2005/0044378 | A1 | 2/2005 | Beard et al. |
| 2005/0091384 | A1 * | 4/2005 | Bodin et al. .................. 709/228 |
| 2005/0198196 | A1 * | 9/2005 | Bohn et al. .................... 709/217 |
| 2005/0198209 | A1 * | 9/2005 | Barrett ......................... 709/219 |
| 2008/0127041 | A1 * | 5/2008 | Gura ............................ 717/101 |

OTHER PUBLICATIONS

Vassilis Kapsalis, Loukas Hadellis, Dimitris Karelis, Stavros Koubias "A dynamic context-aware access control architecture for e-services", Computers & Security 25 (2006), pp. 507-521.*
Brecht, et al., "Para Web: Towards World-Wide Supercomputing", Department of Computer Science, York University, North York, Ontario, Jul. 16, 1996.

* cited by examiner

*Primary Examiner* — Boris Gorney
(74) *Attorney, Agent, or Firm* — Kane Kessler, P.C.; Barry E. Negrin

(57) ABSTRACT

A self-service application console that provides users with restricted access to execute "tasks" in a secure, controlled way. The console allows users to execute scripts, applications or other executable files, using a user interface which abstracts the technical details of the task, as well as eliminates the need for users to have to login to the server. The console provides users with limited or no access to the capabilities of those with more security permissions without risking granting them more access. Tasks may be stored in a database and tasks may be grouped into profiles where the tasks are executed following a defined order.

21 Claims, 16 Drawing Sheets

WebSphere Self Service Console

Home | Manage Profiles | Manage Tasks | Manage Users | Search | Usage History | AWC WASOPS
Edit Task #256 Show all my available Tasks Show all existing Tasks

Pre-Execution Self Service Task Preview

| | |
|---|---|
| Task Id: | 256 |
| Task Name: | View JVMs Status |
| Description: | View the status of all JVMs using JVMCTL status all |
| Task Type: | Remote Execution |
| Use pre-defined target servers: | No |
| Target Servers: | None |
| PBRUN Required: | No |
| Load User Profile: | Yes |
| Executable location: | /www/was50/bin/ |
| Execution directory: | /www/was50/bin/ |
| Executable file name: | jvmctl |
| Parameter(s) to be passed in: | |

Select Target Server(s):

◉ AWC Servers List ○ getServer List

```
--PRODUCTION--
--Red Cell--
proddmred10j
prodwasred10a
prodwasred11a
prodwasred12a
prodwasred20s
--Blue Cell--
proddmblu10j
prodwasblu10a
prodwasblu11a
prodwasblu12a
prodwasblu20s
--Black Cell--
proddmblk10j
prodwasblk10a
prodwasblk11a
prodwasblk12a
prodwasblk20s
--Yellow Cell--
```

Click HERE to validate task on selected server(s).
Click HERE to view the server(s) history.

[ Execute Task ]    [ Back to Main ]

Note: Once you click "Execute Task" the task will be executed and the output will be displayed in a new window. The time it takes for the output to be displayed is equal to the amount of time it takes the script/command to run.

*FIG. 9*

WebSphere Self Service Console

Home | Manage Profiles | Manage Tasks | Manage Users | Search | Usage History | AWC WASOPS Create Profile  Edit Profile #19  Execute Profile #19

Profile details:

| | |
|---|---|
| * Profile Type: | Executable |
| * Profile Id: | 19 |
| * Profile Name: | BOUNCE WEBSPHERE AND AWC. |
| * Description: | Use this profile to bounce WebSphere and AWC. |

Select Target Server(s)
● AWC Servers List    ○ getServer List

1002

1004

```
--PRODUCTION--
--Red Cell--
proddmred10j
prodwasred10a
prodwasred11a
prodwasred12a
prodwasred20s
--Blue Cell--
proddmblu10j
prodwasblu10a
prodwasblu11a
prodwasblu12a
prodwasblu20s
--Black Cell--
proddmblk10j
prodwasblk10a
prodwasblk11a
prodwasblk12a
prodwasblk20s
--Yellow Cell--
```

1006

The following task(s) will be executed in the order specified:

| Execute: | Task Id: | Task Name: | Execution Order: |
|---|---|---|---|
| ✓ | 240 | Stop Nodeagent | 1 |
| ✓ | 238 | Stop dmgr | 2 |
| ✓ | 239 | Start dmgr | 3 |
| ✓ | 241 | Start Nodeagent | 4 |
| ✓ | 217 | AWC Bounce | 5 |
| ✓ | 253 | Start Log Delivery Service (LDS) | 6 |

[ Execute Profile ]

*FIG. 10*

WebSphere Self Service Console

Home | Manage Profiles | Manage Tasks | Manage Users | Search | Usage History | AWC WASOPS
Create Task | Edit Task

Task Details

* Task Id: 256

* Task Name: View JVMs Status

* Target Servers: Enter value(s) here to force the task to ONLY be executed on the specified server(s)
(Separated by a space)

* Description: View the status of all JVMs using JVMCTL status all.
52 # out of 250 chars max.

* Task Type:
○ Local Execute (App Server)  ● Remote Execute  ○ Secure File Copy

* PBRUN Required:
○ Yes  ● No

* Load User Profile: (.~/.profile)
● Yes  ○ No

* Full Path to the command/script executable location: /www/was50/bin
* Full Path where the command/script will be executed: /www/was50/bin
☐ Execute at WAS Home directory(~/)

* Executable/Script file name to be executed: jvmctl

* Parameter(s) to be passed-in:

* Allow Parameters at runtime:
● Yes  ○ No

[Preview Task]  [Delete Task]

WebSphere Self Service Console

Validation results for sever prodwasblu11a

Ping results for server prodwasblu11a:

PING prodwasblu11a.usaa.com (10.8.2.33) 56(84) bytes of data.
64 bytes from prodwasblu11a.usaa.com (10.8.2.33): icmp_seq=0 ttl=350 time = 1.31 ms
64 bytes from prodwasblu11a.usaa.com (10.8.2.33): icmp_seq=1 ttl=350 time = 1.34 ms --- prodwasblu11a.usaa.com ping statistics ---
2 packets transmitted, 2 received, 0% packet loss, time 1001 ms
Rtt min/avg/max/mdev = 1.318/1.329/1.340/0.011 ms, pipe 2

Validating file /www/was50/bin/jvmctl exists:

-rwxr-x--- 1 was www 59370 Apr 20 13:52 /www/was50/bin/jvmctl

[Close this window]

*FIG. 15*

SYSTEMS AND METHODS FOR APPLICATION SERVER SELF-SERVICE CONSOLE

CROSS REFERENCE TO RELATED APPLICATIONS

This application is related to U.S. patent application Ser. No. 12/239,895 filed Sep. 29, 2008, and U.S. patent application Ser. No. 12/239,899 filed Sep. 29, 2008, filed as divisional applications of the instant application, the disclosures of which are incorporated in their entirety.

BACKGROUND

In order for a user to access a server or execute commands or scripts on a computer, the user conventionally has an account on the computer that grants the user access to the server. The account is setup by an administrator having full administrative rights on the server or computer network on which the server communicates. Often there are instances where developers or other non-users have a legitimate need to run scripts or executables on a server, but do not have access to restricted environments. For example, developers may want to gather information pertinent to achieve a particular purpose that would otherwise have to be executed by somebody with login access to the server and appropriate privileges.

While a solution is to grant the developer or non-user access to the server to run the scripts or executables, administrators often do not want to do this in order to protect the integrity of the restricted environment and to maintain strict access control. Thus, balancing the needs of non-users with the security of the restricted environment can be a difficult task for the system administrator.

SUMMARY

A self-service application console that provides users with restricted access to execute "tasks" in a secure, controlled way. The console allows users to execute scripts, applications or other executable files, using a user interface which abstracts the technical details of the task, as well as eliminates the need for users to have to login to the server. The console provides users with unlimited, limited or no access to the capabilities of those with more security permissions without risking granting them more access than necessary. Tasks may be stored in a database and tasks may be grouped into either executable type profiles or security type profiles. Executable type profiles allow grouped tasks to be executed following a defined order when specified and security type profiles are used to group tasks that can be made available to users by mapping the user to the Security profile via a user interface.

In some implementations, a method is provided for defining a task for execution on a server by a non-user without a login account on the server. The method may include providing descriptive information regarding the task, defining environment variables associated with the task, and defining executable characteristics of the task.

In some implementations, a method for defining a task for execution on a server by a non-user without a login account on the server is provided. The method may include providing descriptive information regarding the task, defining environment variables associated with the task, and defining executable characteristics of the task.

In some implementations, a method for executing tasks and profiles on a server by a non-user without a login account on the server includes receiving a request for access to execute a task or profile on the server, authenticating the request against an access database, populating a user interface with a list of tasks and profiles to which the user has rights to execute on the server, receiving a selection of a task or a profile, validating the task or the profile, and executing the task or profile on the server.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there are shown in the drawings example constructions of the implementations; however, the implementations are not limited to the specific methods and instrumentalities disclosed. In the drawings:

FIGS. 6-15 illustrate exemplary user interfaces of the present disclosure.

DETAILED DESCRIPTION

In implementations described below, a self-service application server console provides users with restricted access the ability to execute tasks (e.g., scripts, applications or other executable files) in a secure, controlled fashion, i.e., managed by those who have access to environments. Tasks may be grouped into profiles such that a particular function may be achieved through a predetermined sequence of task execution. The console allows users to execute scripts, applications or other executable files within a user interface that eliminates the need for users to login to the remote server. The console may benefit those with limited access, such as contractors or outside vendors. As will be described below, in some implementations, Java software is used to enable the above capabilities. The console also provides a way to manage users and workflows.

Figure 1:
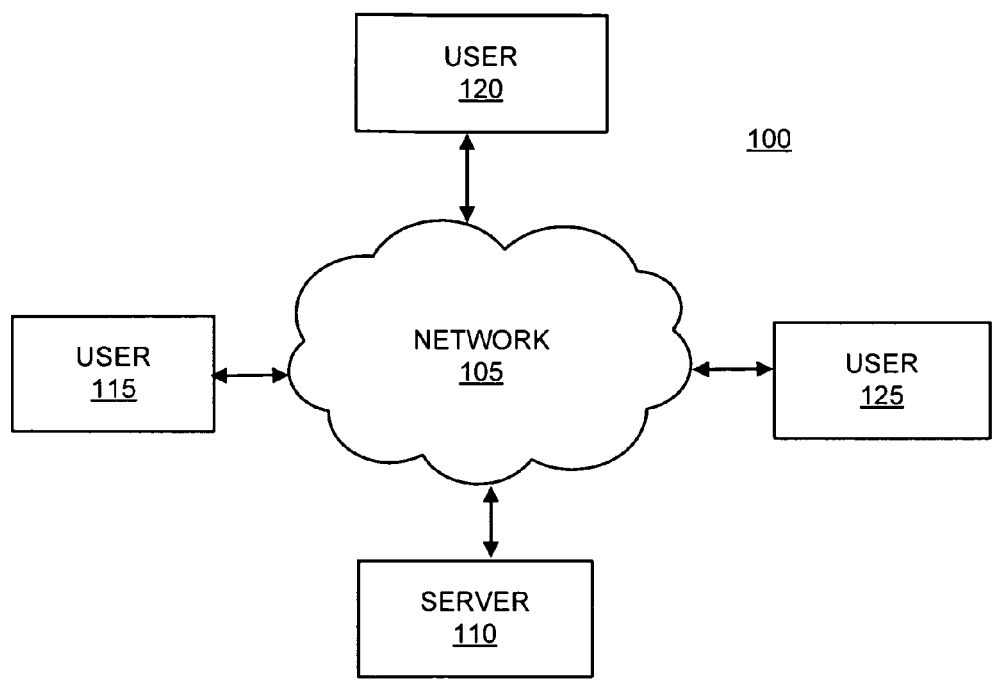
FIG. 1 depicts an example operational environment that may be used to practice aspects of the present disclosure.

Referring now to FIG. 1, there is an overview of an environment in which the self-service console may be implemented. The environment includes a computer network 105 such as, for example, a Transport Control Protocol/Internet Protocol (TCP/IP) network (e.g., the Internet or an intranet). A server 110 may be operably coupled to the network 105 and a plurality of users 115, 120, and 125 may also be operably coupled to the network 105 in order to allow communication between the users 115, 120, and 125 and the server 110.

Each of the server 110, and the users 115, 120, and 125 include a respective network interface for communicating with the network 105 (e.g., outputting information to, and receiving information from, the network 105), such as by transferring information (e.g., instructions, data, signals) between such users 115, 120, and 125 and the network 105. Accordingly, through the network 105, the server 110 communicates with the users 115, 120, and 125, and the users 115, 120, and 125 communicate with the server 110.

For clarity, FIG. 1 depicts only one server 110. However, the system may include a plurality of servers that are substantially identical to the server 110. Likewise, for clarity, FIG. 1 depicts only three users 115, 120, and 125. However, the system may include a plurality of users that are substantially identical to the users 115, 120, and 125.

Each of the server 110 and the users 115, 120, and 125 may be implemented in various electronic circuitry components and/or software components. For example, the users 115, 120 and 125 may be operating a server computer, a personal computer (e.g., a desktop computer or a portable computer such as, for example, a laptop computer), or a handheld computer.

Figure 2:
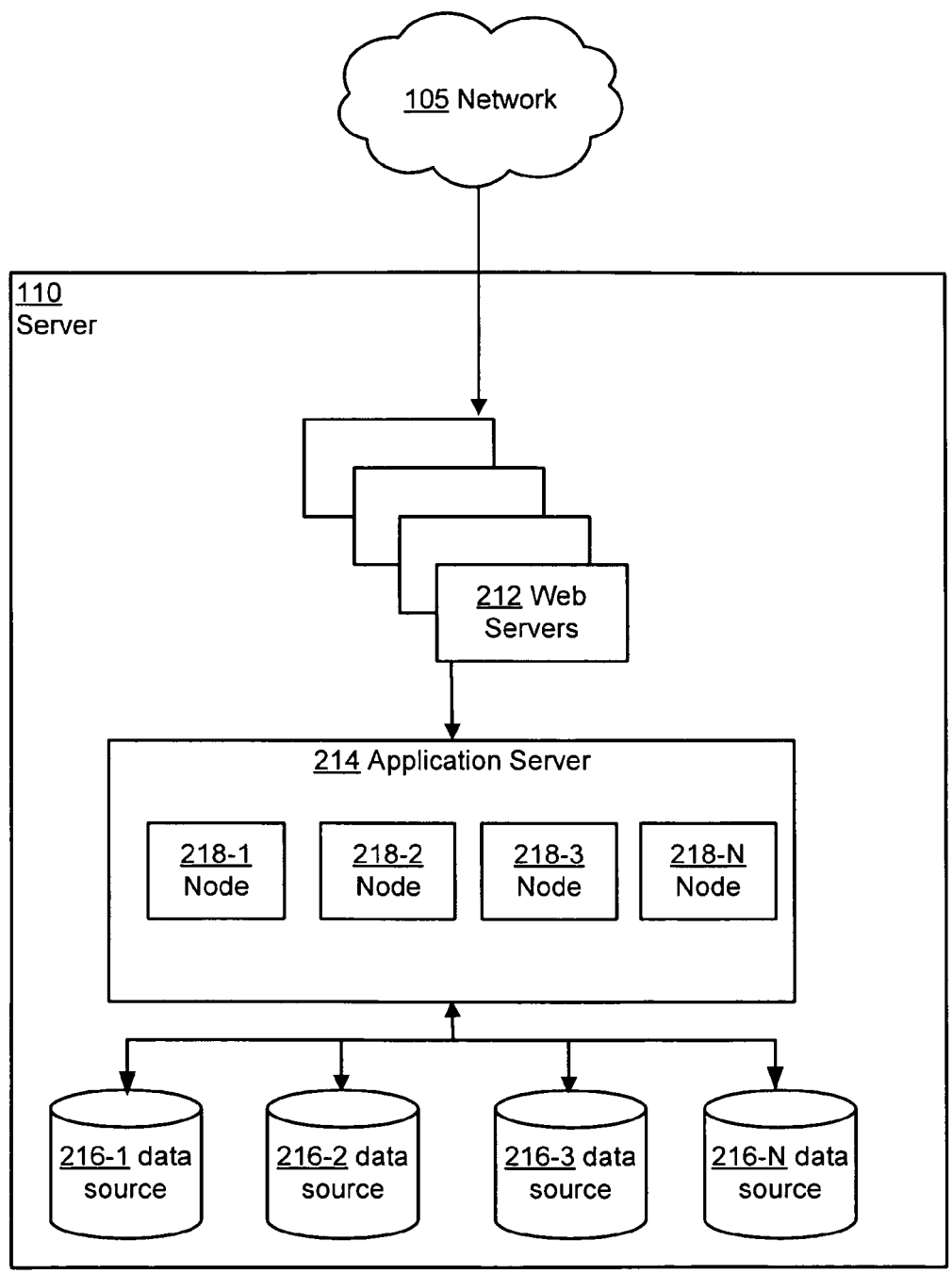
FIG. 2 depicts an example server.

Referring now to FIG. 2, the server 110 is illustrated in more detail. For example, one or more web servers 212 such as, for example, Hyper Text Transfer Protocol (HTTP) servers, may be maintained by the server 110, and may be operably coupled to the network 105, described above with reference to FIG. 1. In some implementations, an application server 214, e.g., a WebSphere Application Server available from IBM Corp., may be maintained by the server 110, and may be operably coupled to the web server(s) 212.

In some example implementations, the application server 214 can include one or more nodes 218-1 through 218-N (where N is an integer greater than 1), e.g., logical machines, and/or physical machines that can include one or more virtual machines configured to service requests received from clients such as logon requests, request to view account info, etc. For example, the requests may be received from one of users 115, 120 and 125.

When a request is received by a node, node 218-1 for example, the node 218-1 carries out the requested function by accessing one or more data sources 216-1 through 216-N (where N is an integer greater than 1) to perform an action, e.g., a read/write request, etc. In some implementations, each node 218-1 through 218-N can include a JAVA database connectivity API (JDBC), or a JAVA connector architecture (J2C) configured to query data sources 216-1 through 216-N. In some implementations data sources 216-1 through 216-N may be located remote from the server 110, and may be operably coupled to the server 110. Thus, as the web server(s) 212 receive requests, they can route the requests to a specific node that is configured to handle such request, and the node can access the appropriate data source to perform the desired function.

Figure 3:
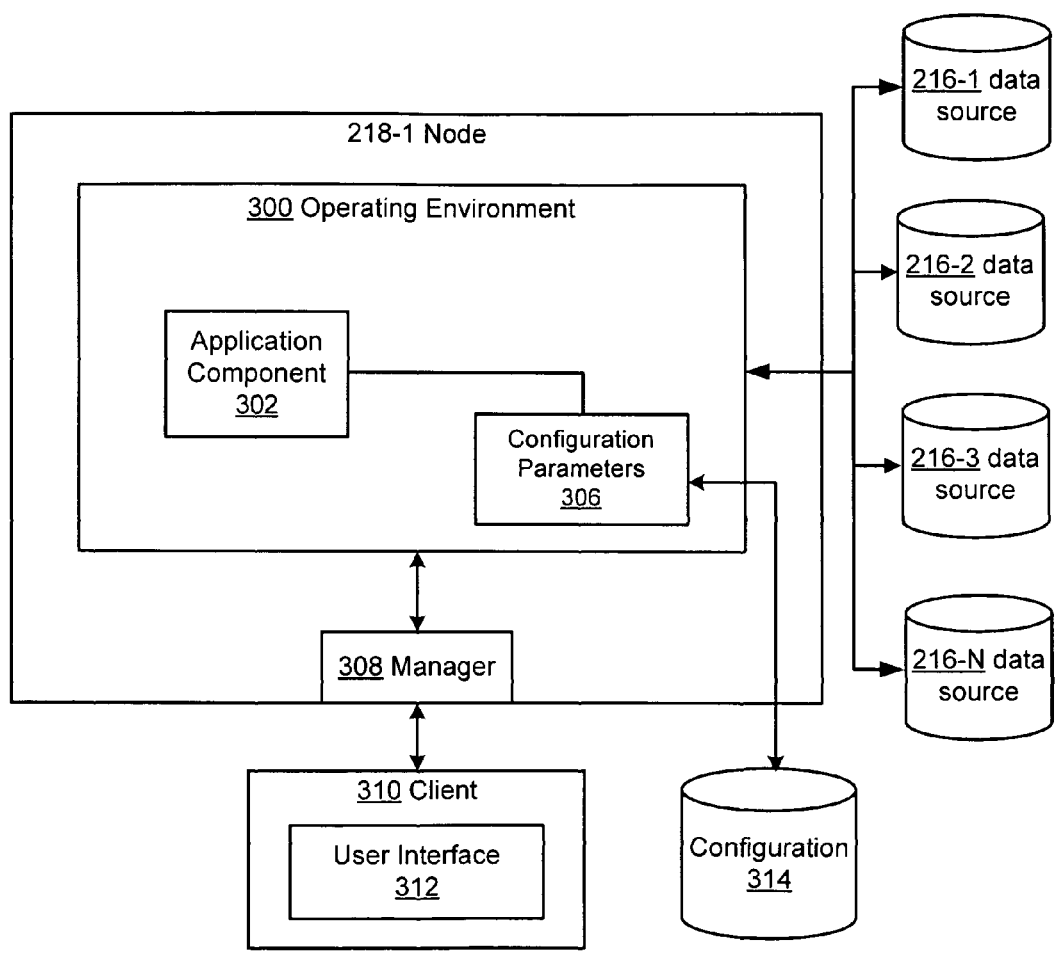
FIG. 3 depicts an example node of an application server.

Referring now to FIG. 3, there is illustrated an example node of an application server, for example within node 218-1 of the application server 214 depicted in FIG. 2. An application component 302, such as, for example, a servlet, a JAVA bean, or an enterprise JAVA bean (EJB) configured to perform a function such as accessing user accounts, is included in node 218-1, and may be operably coupled to the application server 214, described above with reference to FIG. 2. An operating environment 300, e.g., a virtual machine such as a Java Virtual Machine® from Sun Microsystems®, or a physical machine in other implementations, may be included in node 218-1, and may be configured to effect the application component 302, and interface with one or more of the data sources 216-1 through 216-N.

A configuration file repository 314 may contain configuration files used by the node 218-1. When node 218-1 is supplied with power, or when the operating environment 300 is enabled, the node 218-1 may acquire configuration parameters from the configuration file repository 314, and store them in configuration parameter memory 306 to affect how calls to the data sources 216-1 through 216-N are handled.

FIG. 3 also illustrates a manager 308, and a client 320 with a user interface 312. For example, in some implementations, the client 320 may include a terminal or a personal computer configured to transmit and receive information from the manager 308 and render the information in a user interface 312 of the client 320 such as a browser. The client 320 may be operated by one of the users 115, 120 and 125. The manager 308 can include an API for the management, and monitoring of resources such as applications, devices, services and operating environments such as operating environment 300. In at least one implementation of the present disclosure, the manager 308 includes an architecture similar to that of Java Management Extensions® from Sun Microsystems®.

Figure 4:
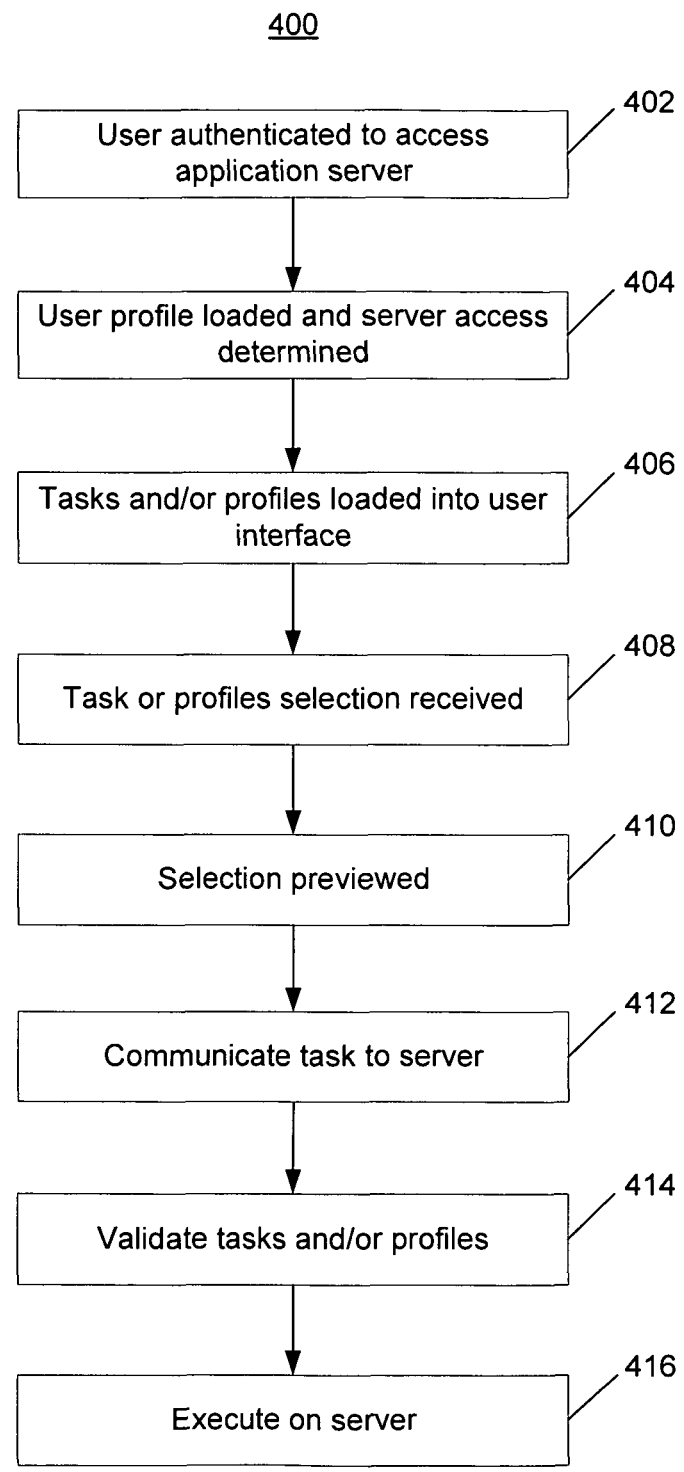
FIG. 4 depicts an operational flowchart illustrating implementations of the present disclosure.

FIG. 4 depicts an operational flowchart 400 illustrating implementations of the present disclosure. At 402, a user accessing the self-service console is authenticated and a list of servers available to the user is retrieved. In some implementations, users of the self-service console may be added, either manually or according to a user profile, to one of data sources 216-1 through 216-N. The data source 216-1 through 216-N that stores the self-service users may be an AWC database (hereinafter "the database"). The database may include user information, roles, security group information, and information regarding which servers 110, application servers 214 or nodes 218-1 through 218-N that the user may access. As described below, references to a "server" or "servers" may include any of the server 110, the application server 214 or the nodes 218-1 through 218-N. When a user accesses the self-service console through, e.g., the user interface 312, an API provided by the manager 308 makes a call to the database to determine if the user is authorized to access the self-service console.

At 404, the user profile is loaded and a list of servers to which the user has access is determined. Using the API provided by the manager 308, a call to the database is made to fetch the user profile information and a list of servers to which the user may have access. The profile may determine which tasks and/or profiles the user may execute on which servers the user may have access.

Figure 6:
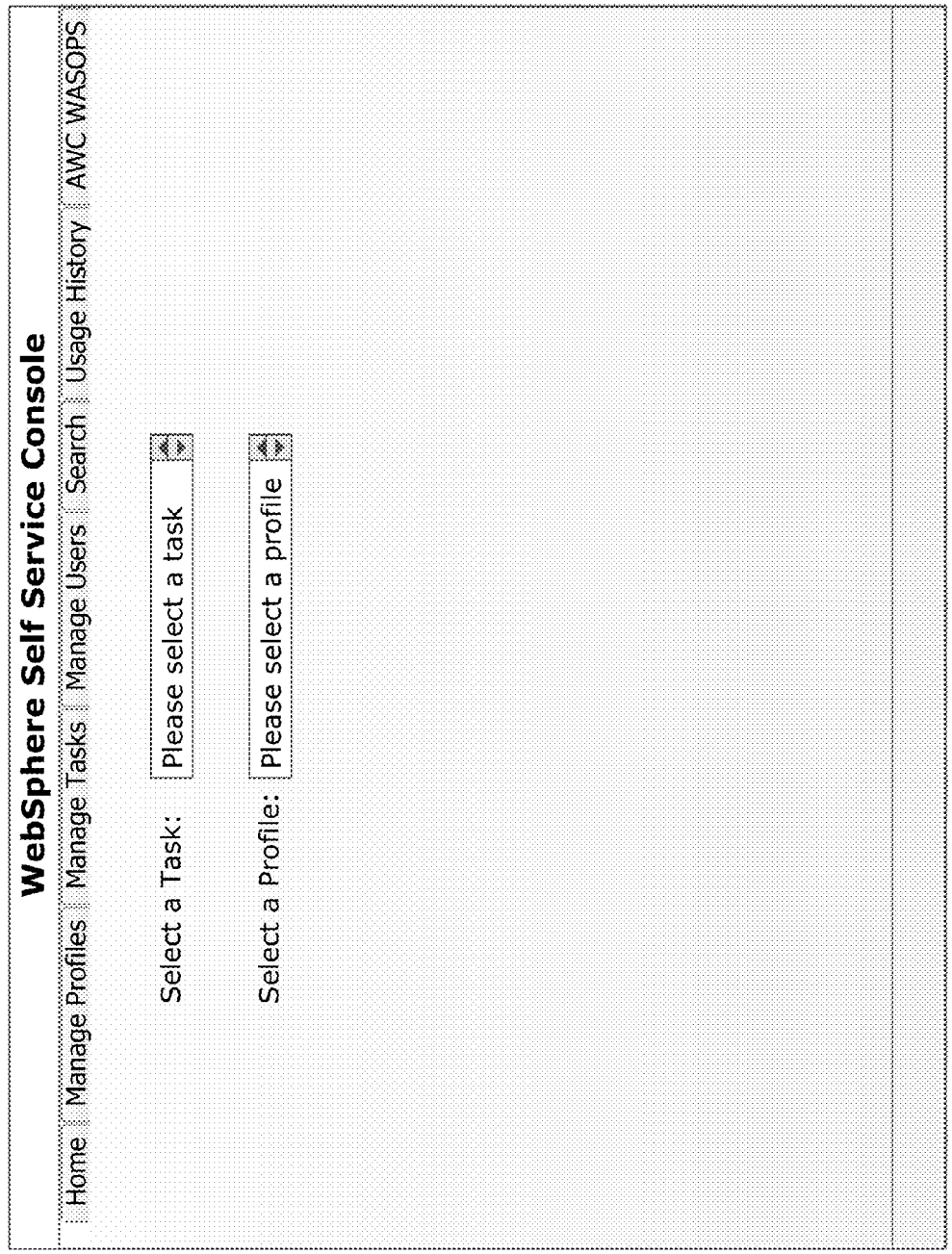
Figure 7:
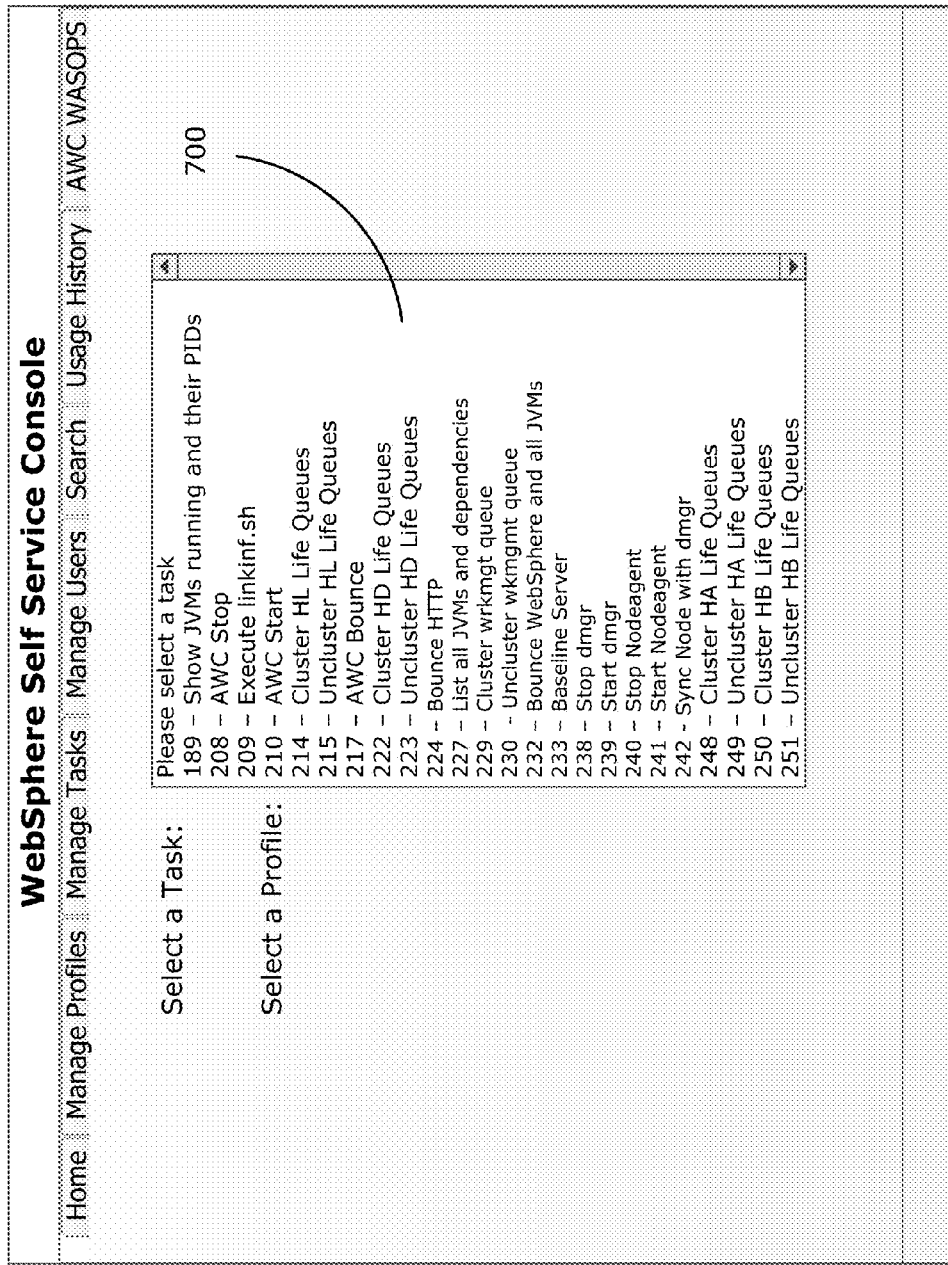
Figure 8:
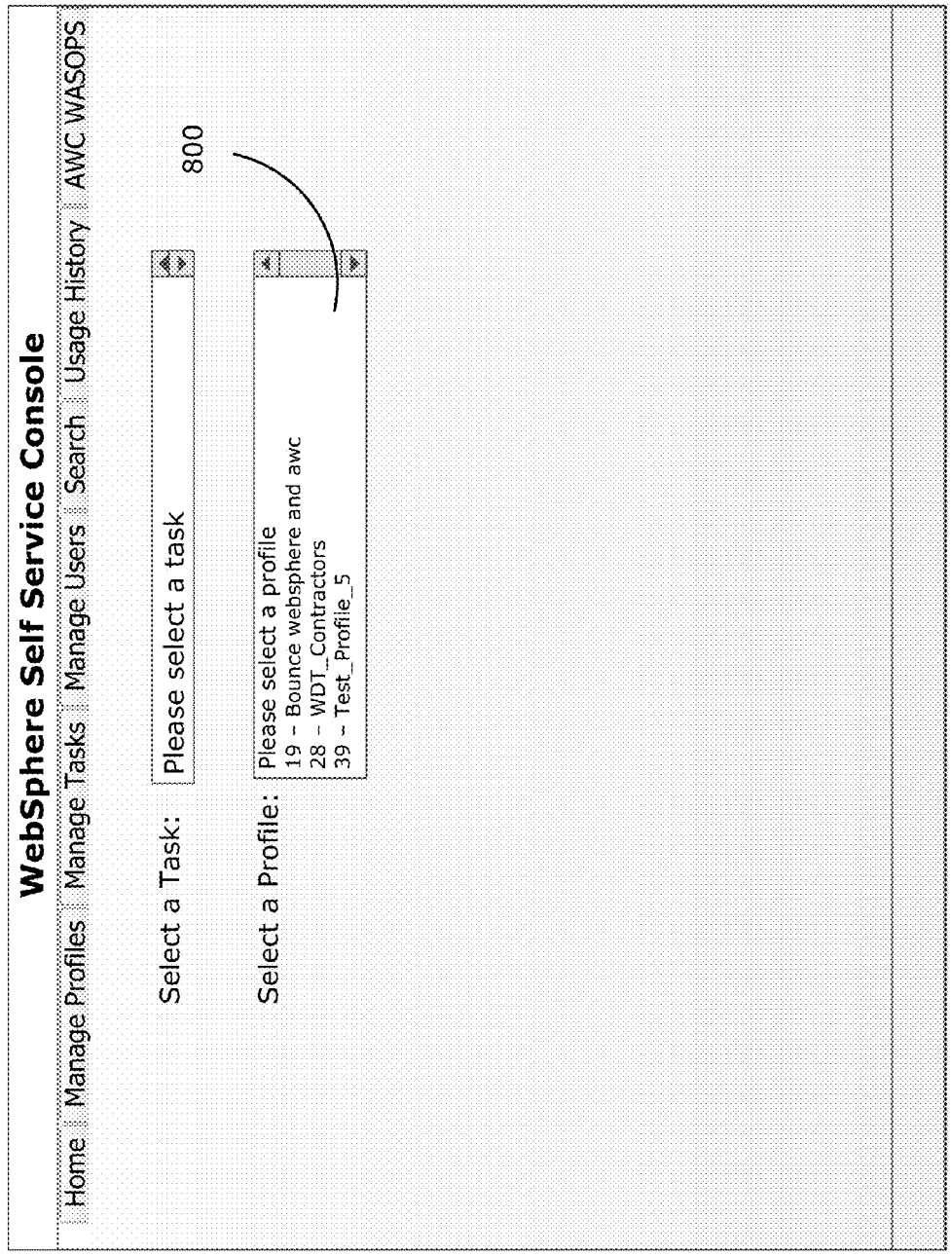

At 406, the task and/or profiles are loaded into the user interface. For example, as show in FIGS. 6-8, the user interface 312 may provide a list of tasks and/or profiles available to the user based on information contained in the database. Tasks may be individual commands, script files, etc. that may be executed on a particular server. In some implementations, tasks may be grouped into profiles, which are one or more tasks that share a relationship, execution order, etc. to achieve a particular function, such as managing a server.

At 408, a user selection of a task or profile is received. For example, in FIG. 7, the user may select task "189—Show JVMs running and their PIDs" from the drop down list 700. At 410, the selected task is previewed. A task may be defined as follows:

| | |
|---|---|
| Name: | Show JVMs running and their PIDs |
| Path: | /www/was50/bin |
| Exec_Location: | /www/was50/bin |
| Parameters: | -all |
| File_name: | jvmctl |
| FULLCMDSTRING: | pbrun ".˜/.profile cd /www/was50/bin;/www/was40/bin/jvmctl - all |

The user interface of FIG. 9 may be presented to preview the task. The environmental variables, paths, executable and other details 900 noted above in the task definition may be presented along with a list of servers 902 on which the task may be executed.

In some implementations, at 408, a user may select a profile. For example, in FIG. 8, the user may select the profile "19—BOUNCE WEBSPHERE AND AWC" from the drop down list 800. At 410, the profile is previewed. A user interface 312 such as FIG. 10 may presented to illustrate details to the profile 1002, a list of servers 1004 on which the profile may be executed, and the tasks associated with the profile 1006.

At 412, a connection is made to the server on which the task will be executed. In some implementations, an SSH client-server connection may be made between the client 310 and the server 110. In some implementations, a connection using RMI with authentication using SOAP may be provided. A Java session may be created on the client 310 to communicate securely with the server 110 using the RMI protocol connection. SOAP may be used to exchange information (e.g., XML documents) between the Java virtual machines running on the client 310 and server 110 after the connection is established. For example, a POST command may be executed to a servlet running in the application component 302 on the server.

At 414, the task is validated. When the user selects a task and/or profile, is may be checked using JavaScript to ensure that unexpected or unwanted commands are not being piped to the task or profile. The servlet may then read the FULLCMDSTRING and the process is then executed on the server 110. In some implementations, the task may be validated before execution to ensure all of the dependencies are satisfied prior to execution. In some implementations, it is determined if the server is available and if the file to be executed by the task exists on the server. FIG. 15 illustrates the result of such a determination that is provided to the user. In some implementations, if the task does not exist on the server where it is to be executed, it may be copied using, e.g., SCP, from the client device 310 to the server 110 to ensure the task exists on the target server.

At 416, the task is executed on the target server. A user interface providing results or status may be displayed to the user to illustrate the success, failure or current status of the task and/or profile execution.

Figure 5:
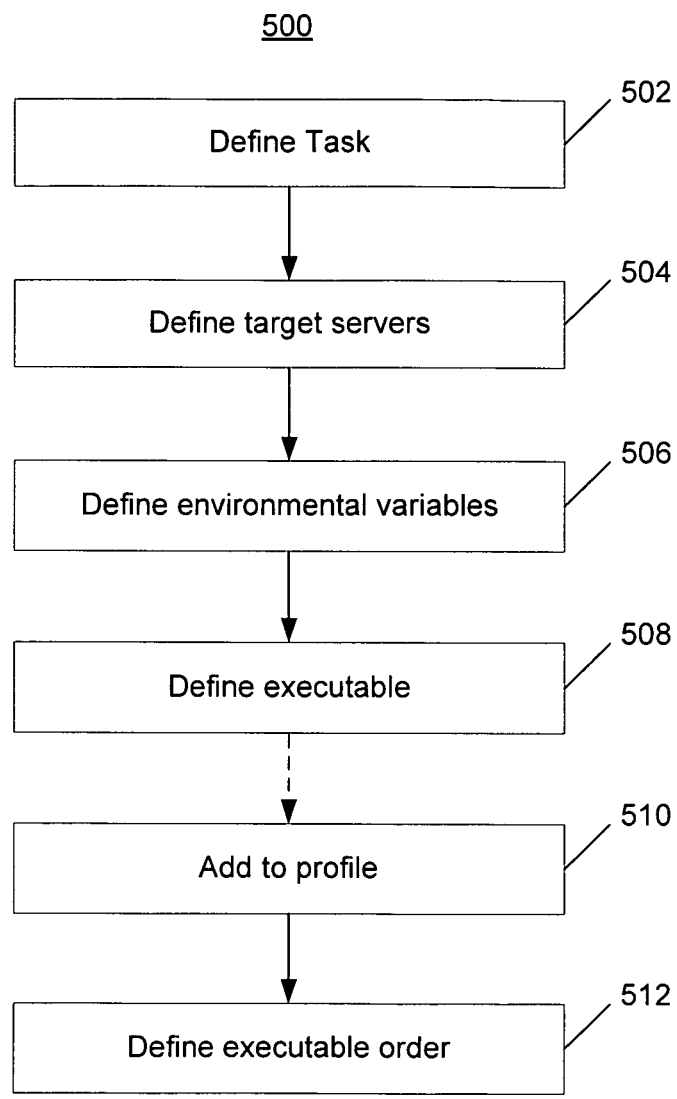
FIG. 5 depicts an operational flowchart illustrating implementations of the present disclosure.

FIG. 5 depicts an operational flowchart 500 illustrating implementations of the present disclosure to define tasks and/or profiles. At 502, a task is defined. For example, as show in FIG. 11, the task may be provided an ID number, name, description and a task type to set if the task is run locally or remotely. At 504, target servers are defined. As shown in FIG. 11, target servers may defined are retrieved by calling to a database of servers. In addition, local or remote execution of the task may be defined. At 506, environmental variables are set. As shown in FIG. 11, checkboxes are provided to set if PBRUN is required, or if the user's home profile is loaded, as well as paths to an executable. At 508, the task is defined. As shown, a script to be executed and parameters to be passed during execution may be defined. In some implementations, the information prepared at one or more of 502-508 may be used to dynamically generate the FULLCMDSTRING when the task is selected by a user for execution.

Figure 12:
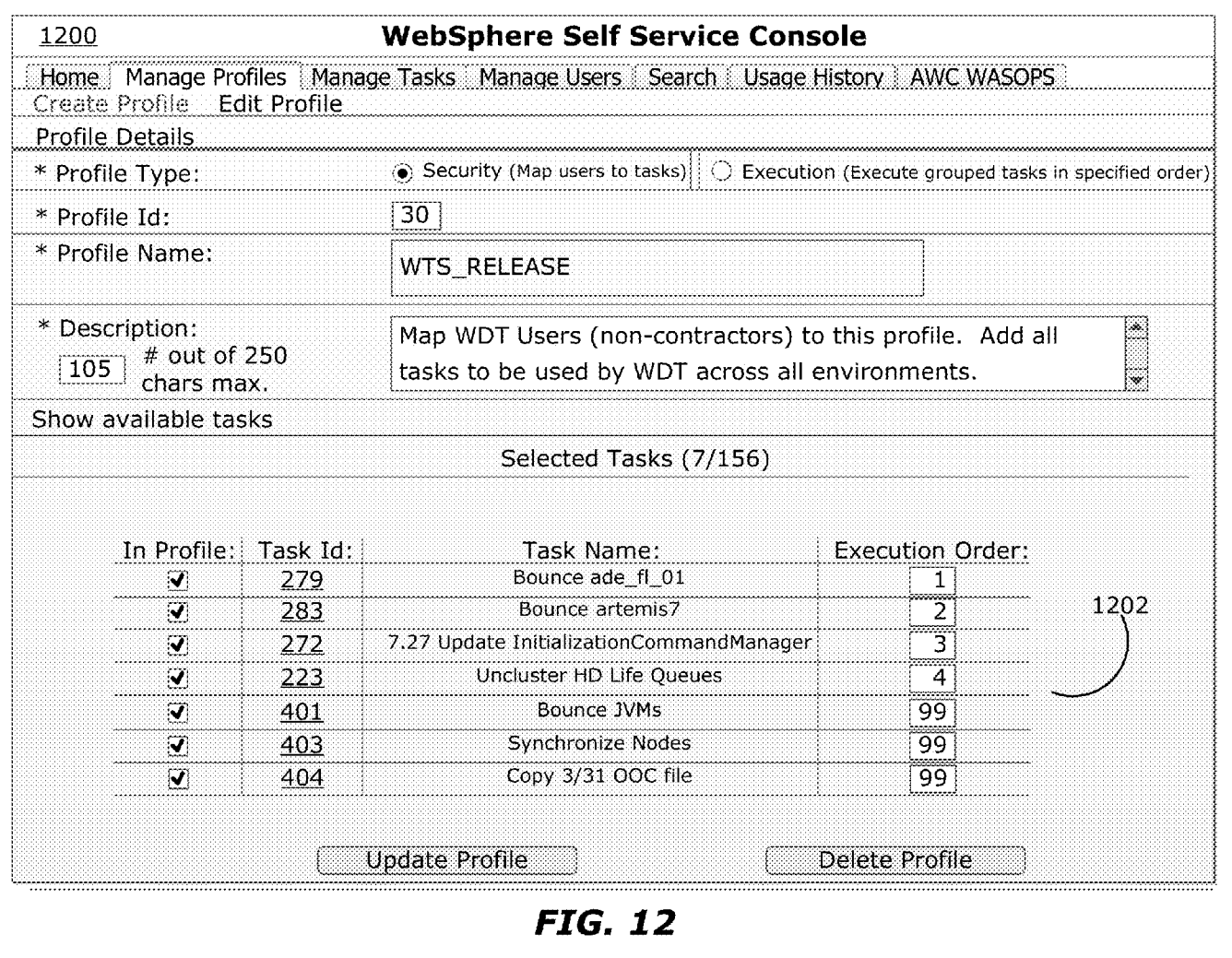

In some implementations, a profile may be created that includes the task defined in 502-508. At 510, the task may be added to a profile or used to create a profile. As shown in FIG. 12, the task may be added to the task definition area 1200. At 512, an order may be provided for task execution. For example, and given a task execution order 1202.

Figure 13:
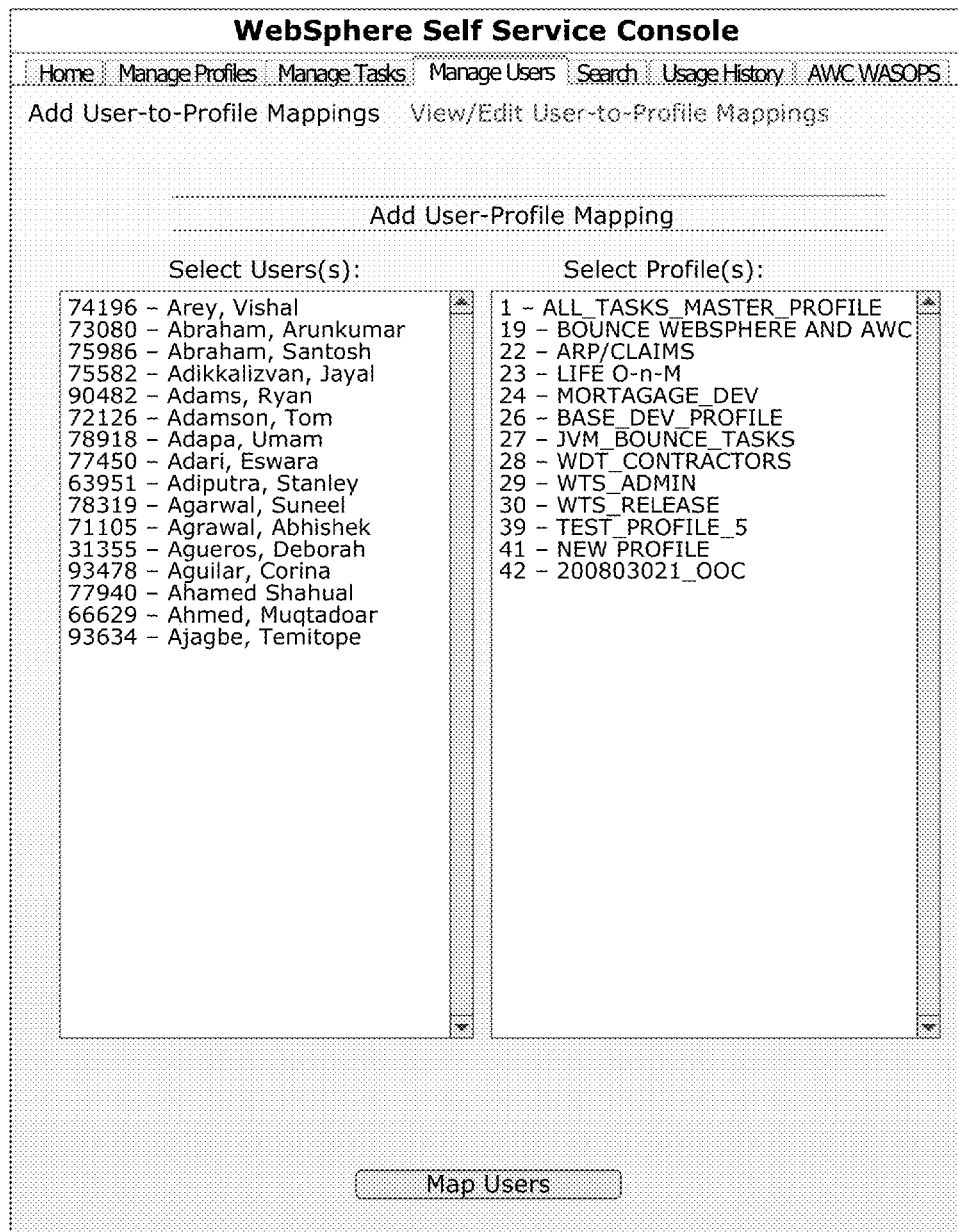

FIG. 13 illustrates a mapping of users to profiles that may be maintained in the database. A master profile may be maintained that contains all tasks. From the master profile, profiles may be selected and access thereto granted to a particular user using the interface of FIG. 13. The mapping defines which users are authorized to execute which tasks.

Figure 14:
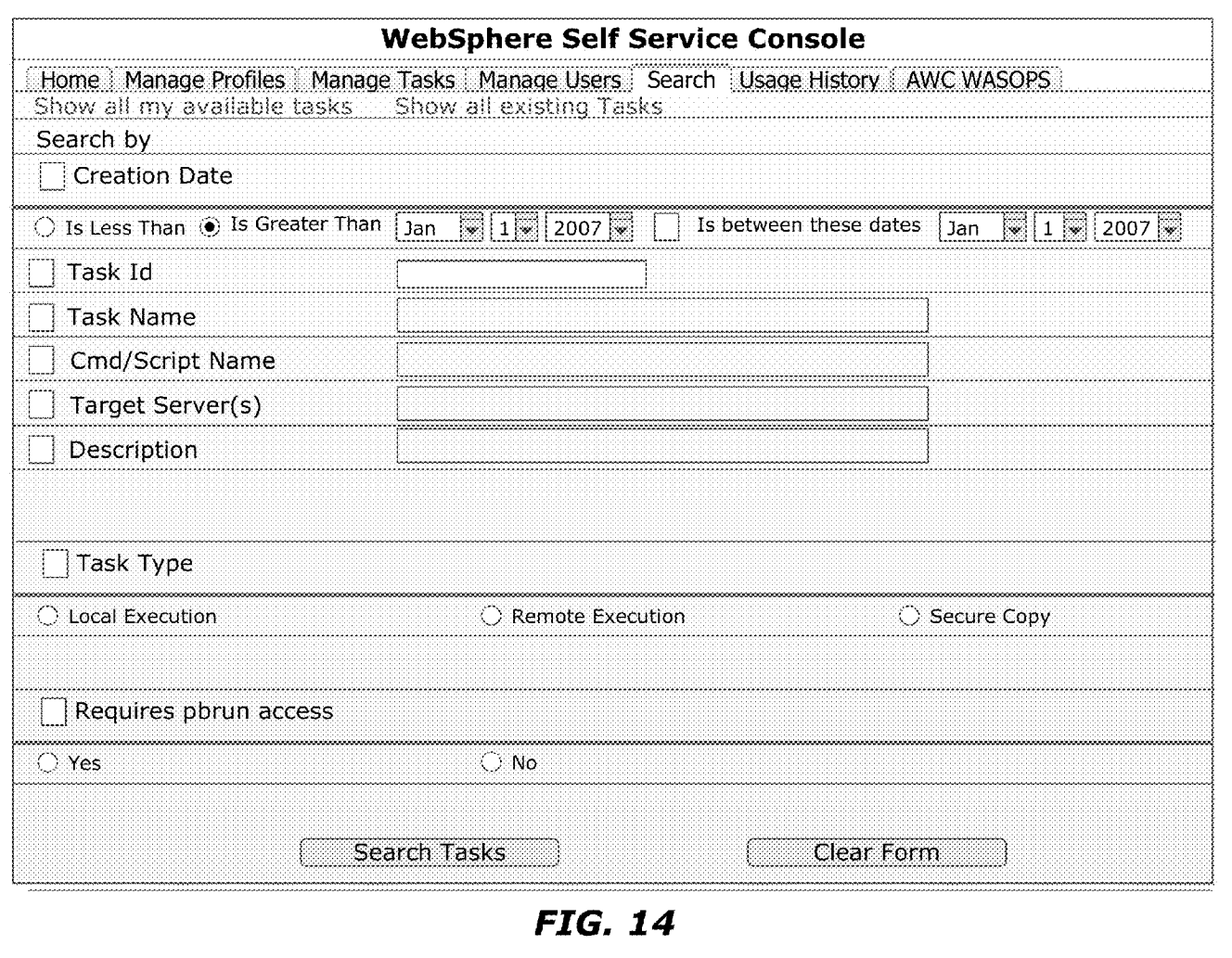

As shown in FIG. 14, a search facility may be provided to search available tasks. A list of tasks the user has access to may be provided through a "show my tasks" option.

Exemplary Computing Arrangement

Figure 16:
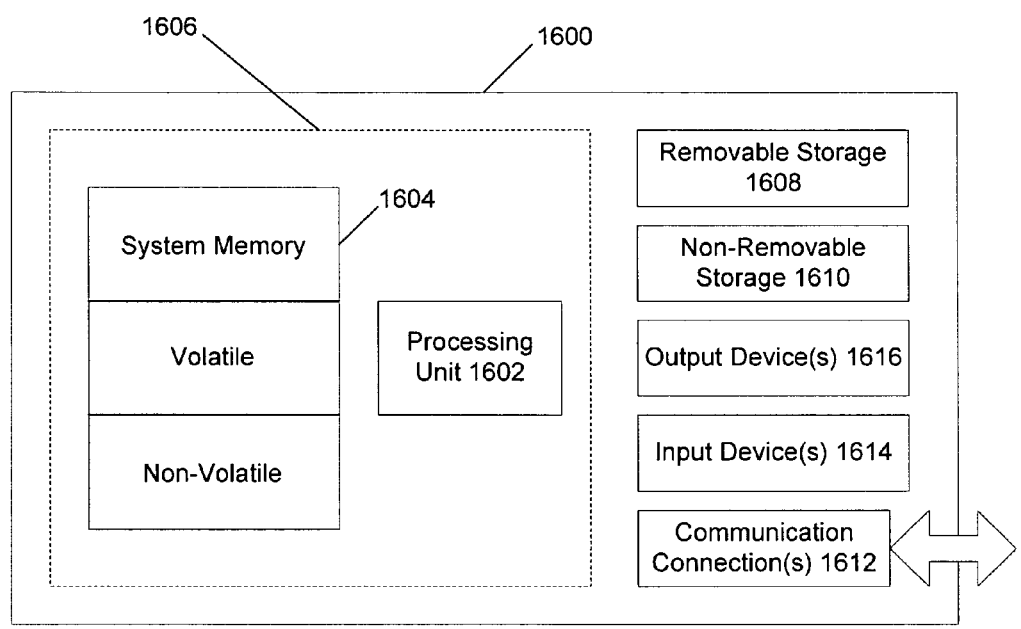
FIG. 16 is a block diagram of an example computing environment in which example aspects may be implemented.

FIG. 16 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 16, an exemplary system for implementing aspects described herein includes a computing device, such as computing device 1600. In its most basic configuration, computing device 1600 typically includes at least one processing unit 1602 and system memory 1604. Depending on the exact configuration and type of computing device, system memory 1604 may be volatile (such as random access memory (RAM)), non-volatile (such as read-only memory (ROM), flash memory, etc.), or some combination of the two. This most basic configuration is illustrated in FIG. 16 by dashed line 1606.

Computing device 1600 may have additional features and/or functionality. For example, computing device 1600 may include additional storage (removable and/or non-removable) including, but not limited to, magnetic or optical disks or tape. Such additional storage is illustrated in FIG. 16 by removable storage 1608 and non-removable storage 1610.

Computing device 1600 typically includes a variety of computer-readable media. Computer-readable media may be any available media that may be accessed by computing device 1600 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 1604, removable storage 1608, and non-removable storage 1610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1600. Any such computer storage media may be part of computing device 1600.

Computing device 1600 may also contain communication connection(s) 1612 that allow the computing device 1600 to communicate with other devices. Communication connection(s) 1612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 1600 may also have input device(s) 1614 such as a keyboard, mouse, pen, voice input device, touch input device, etc. Output device(s) 1616 such as a display, speakers, printer, etc. may also be included. All these devices are well known in the art and need not be discussed at length here.

Computing device 1600 may be one of a plurality of computing devices 1600 inter-connected by a network. As may be appreciated, the network may be any appropriate network, each computing device 1600 may be connected thereto by way of communication connection(s) 1612 in any appropriate manner, and each computing device 1600 may communicate with one or more of the other computing devices 1600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) may be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium comprising computer-readable instructions for executing a task on a server by a user, the method comprising:
   authenticating the user who is not logged into an account against an access database, wherein the access database has tasks grouped in a number of profiles, wherein the number of profiles are executable type profiles or security type profiles and each profile from the number of profiles includes a number of tasks, and wherein the access database includes information regarding servers that the user has access to execute the number of tasks;
   retrieving a predetermined list of tasks and a profile among the number of profiles associated with the user;
   receiving a selected task from the predetermined list of tasks and the profile;
   retrieving a list of servers that specifies a server that the user has access to execute the selected task on, wherein execution of the selected task is particular to the server specified from the list of servers;
   making a connection to the specified server from the list of servers that the user has access to complete the selected task on;
   validating the selected task prior to execution of the selected task, wherein validating the selected task includes satisfaction of dependencies associated with the selected task;
   adding the validated task to the profile; and
   executing the validated task on the specified server.

2. The non-transitory computer-readable medium of claim 1, the method further comprising retrieving a predetermined list of profiles that may be executed by the user on the server, wherein each of the profiles from the predetermined list of profiles is a group of one or more tasks that are to be executed on the server in a predetermined order.

3. The non-transitory computer-readable medium of claim 2, the method further comprising:
   receiving a selection of a profile from the predetermined list of profiles; and
   executing the profile on the server.

4. The non-transitory computer-readable medium of claim 3, the method further comprising:
   providing the predetermined list of tasks and the predetermined list of profiles in a graphical user interface executed on a client device.

5. The non-transitory computer-readable medium of claim 1, the method further comprising:
   validating the task on the server; and
   correcting task execution errors.
6. The non-transitory computer-readable medium of claim 1, the method further comprising:
   executing a process on the server to receive communications from a client device after the user is authenticated;
   establishing a connection between the client device and the server; and
   communicating the task to the server over the connection.
7. The non-transitory computer-readable medium of claim 1, the method further comprising:
   previewing the task to the user; and
   providing an indication of the result of executing the task.
8. A method for executing a task on a server by a user, the method comprising:
   authenticating the user who is not logged into an account against an access database, wherein the access database has tasks grouped in a number of profiles, wherein the number of profiles are executable type profiles or security type profiles and each profile from the number of profiles includes a number of tasks, and wherein the access database includes information regarding servers that the user has access to execute tasks from the number of tasks;
   retrieving a predetermined list of tasks and a profile among the number of profiles associated with the user;
   receiving a selected task from the predetermined list of tasks and the profile;
   retrieving a list of servers that specifies a server that the user has access to execute the selected task on, wherein execution of the selected task is particular to the server specified from the list of servers;
   making a connection to the specified server from the list of servers that the user has access to complete the selected task on;
   validating the selected task prior to execution of the selected task, wherein validating the selected task includes satisfaction of dependencies associated with the selected task;
   adding the validated task to the profile; and
   executing the validated task on the specified server.
9. The method of claim 8, further comprising retrieving a predetermined list of profiles that may be executed by the user on the server, wherein each of the profiles from the predetermined list of profiles is a group of one or more tasks that are to be executed on the server in a predetermined order.
10. The method of claim 9, further comprising: receiving a selection of a profile from the predetermined list of profiles; and
   executing the profile on the server.
11. The method of claim 10, further comprising:
   providing the predetermined list of tasks and the predetermined list of profiles in a graphical user interface executed on a client device.
12. The method of claim 8, further comprising:
   validating the task on the server; and
   correcting task execution errors.
13. The method of claim 8, further comprising:
   executing a process on the server to receive communications from a client device after the user is authenticated;
   establishing a connection between the client device and the server; and
   communicating the task to the server over the connection.
14. The method of claim 8, further comprising:
   previewing the task to the user; and
   providing an indication of the result of executing the task.
15. A system for executing a task on a server by a user, comprising:
   a processor;
   a memory storing computer-readable instructions for executing a task on a server by a user, the computer-readable instructions executable by the processor to;
   authenticate the user who is not logged into an account against an access database, wherein the access database has tasks grouped in a number of profiles, wherein the number of profiles are executable type profiles or security type profiles and each profile from the number of profiles includes a number of tasks, and wherein the access database includes information regarding servers that the user has access to execute the number of tasks;
   retrieve a predetermined list of tasks and profile among the number of profiles associated with the user;
   receive a selected task from the predetermined list of tasks and the profile;
   retrieve a list of servers that specifies a server that the user has access to execute the selected task on, wherein execution of the selected task is particular to the server specified from the list of servers;
   make a connection to the specified server from the list of servers that the user has access to complete the selected task on;
   validate the selected task prior to execution of the selected task, wherein validation of the selected task includes satisfaction of dependencies associated with the selected task;
   add the validated task to the profile; and
   execute the validated task on the specified server.
16. The system of claim 15, wherein a predetermined list of profiles is retrieved, wherein the predetermined list of profiles may be executed by the user on the server, and wherein each of the profiles from the predetermined list of profiles is a group of one or more tasks that are to be executed on the server in a predetermined order.
17. The system of claim 16, wherein the instructions executable by the processor to receive the selection further include instructions executable to: receive a profile from the predetermined list of profiles; and
   execute the profile on the server.
18. The system of claim 17, wherein the predetermined list of tasks and the predetermined list of profiles is provided in a graphical user interface executed on a client device.
19. The system of claim 15, wherein the instructions executable by the processor to receive the selection of the task further include instructions executable to validate the task on the server, and wherein task execution errors are corrected.
20. The system of claim 15, wherein a process is executed on the server to receive and establish communications between a client device and the server after the user is authenticated, and wherein the task is communicated to the server over the connection.
21. The system of claim 15, wherein the task is previewed to the user, and wherein an indication of the result of executing the task is provided.

* * * * *